T. LOE.
LITTER CARRIER.
APPLICATION FILED APR. 27, 1910.

1,012,667.

Patented Dec. 26, 1911.
2 SHEETS—SHEET 2.

Witnesses.
A. H. Opsahl.
E. C. Skinkle

Inventor.
Theodore Loe.
By his Attorneys
Williamson & Merchant

UNITED STATES PATENT OFFICE.

THEODORE LOE, OF LAKEVILLE, MINNESOTA.

LITTER-CARRIER.

1,012,667.  Specification of Letters Patent.  Patented Dec. 26, 1911.

Application filed April 27, 1910. Serial No. 558,052.

*To all whom it may concern:*

Be it known that I, THEODORE LOE, a citizen of the United States, residing at Lakeville, in the county of Dakota and State of Minnesota, have invented certain new and useful Improvements in Litter-Carriers; and I do hereby declare the following to be a full, clear, and exact description of the invention, such as will enable others skilled in the art to which it appertains to make and use the same.

My invention has for its object to provide an improved litter carrier and, to this end, it consists of the novel devices and combinations of devices hereinafter described and defined in the claims.

In the accompanying drawings which illustrate the invention, like characters indicate like parts throughout the several views.

Figure 1:
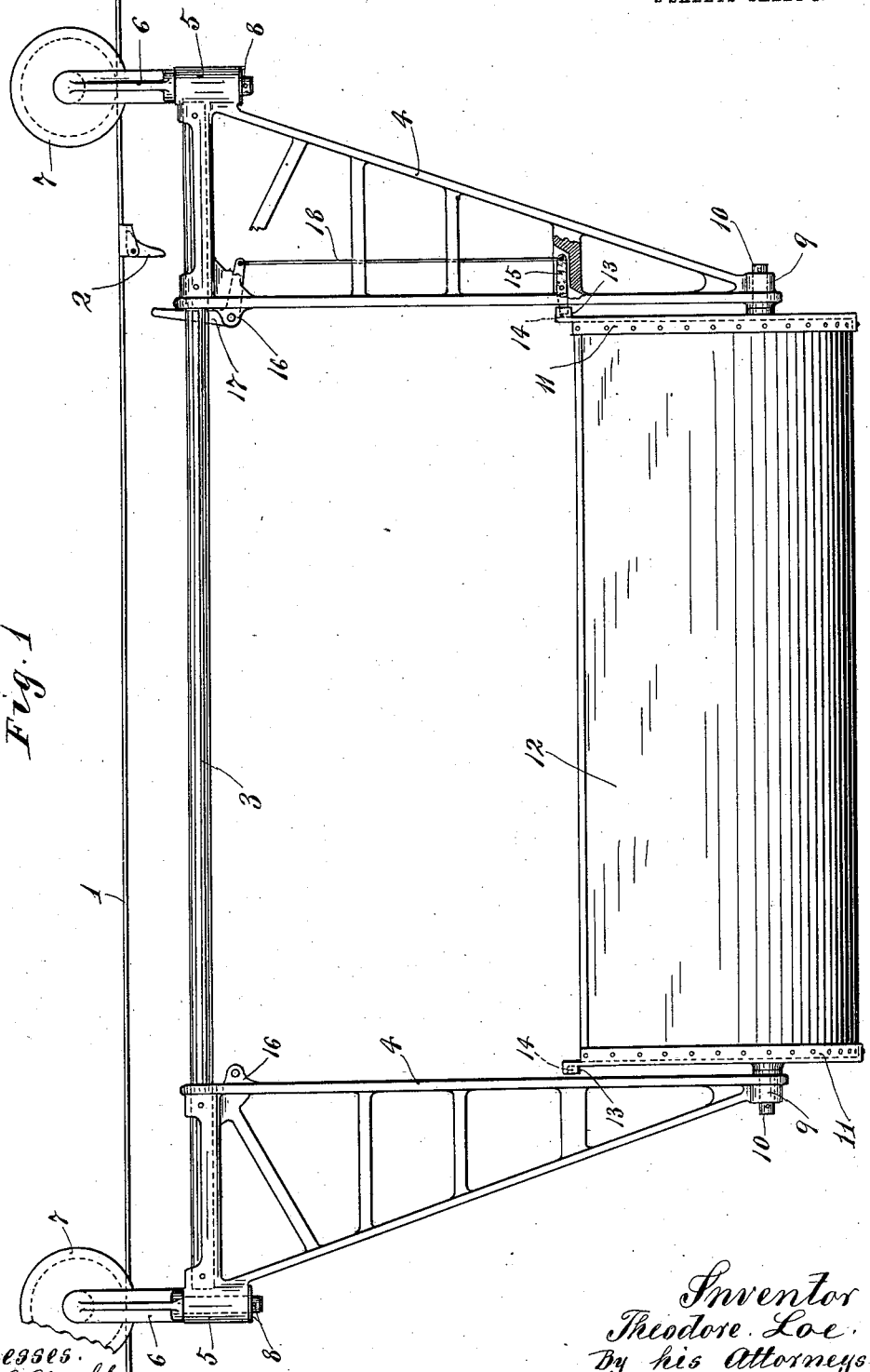
Figure 2:
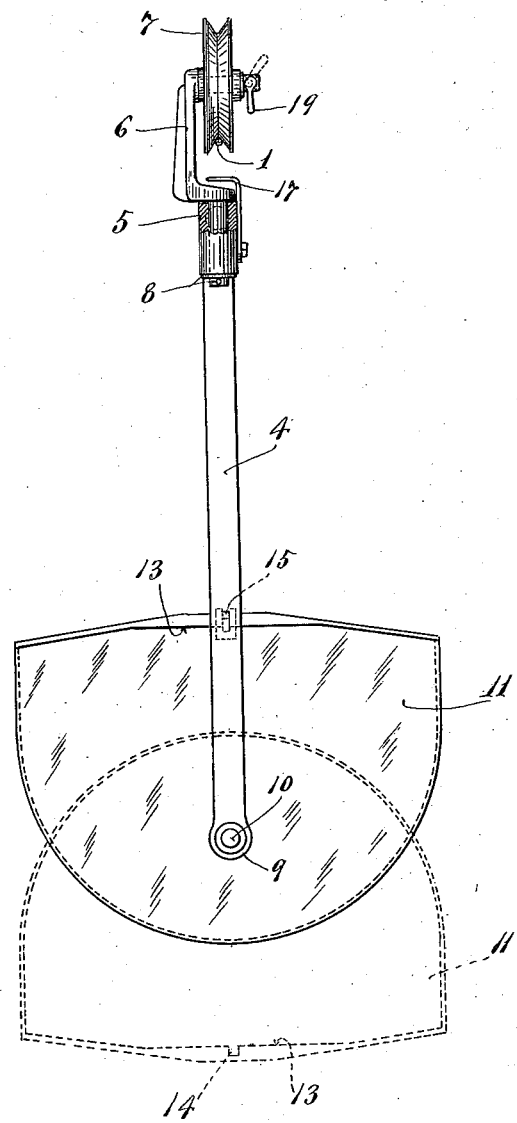

Referring to the drawings, Figure 1 is a view in side elevation, with some parts broken away, showing my improved litter carrier applied on an elevated track wire; and Fig. 2 is an end elevation of the parts shown in Fig. 1, some parts being broken away.

The numeral 1 indicates the elevated track wire which is provided, at the proper point, with a depending bucket tripping lug 2 which is rigidly but preferably adjustably secured on the said track wire.

The truck frame, to which the bucket is pivotally connected, is made of such construction that the truck wheels that run upon the track wire are located far apart or, in other words, the truck is given a wheel base that is much longer than the litter bucket. This long wheel base very greatly decreases the tendency of the bucket and truck frame to oscillate longitudinally or in the vertical plane of the track wire, and in this way, reduces or eliminates the tendency of the truck wheels to jump the track. This improved truck frame, as preferably constructed, comprises a longitudinally extended top bar 3, preferably in the form of an iron pipe, and a pair of depending trussed end brackets 4 rigidly secured to said top bar at their upper ends and provided, at their extreme upper and outer portions, with vertical sockets 5, in which are pivotally mounted the depending stems of wheel brackets 6. These wheel brackets 6 are open at one side and are provided, at their upper ends, with laterally projecting trunnions, upon which are journaled grooved truck wheels 7 that run on the track wire 1. The wheel brackets 6 are pivotally connected to the frame brackets 4, so that the truck wheels may properly travel on a curved track. The stems of the said wheel brackets, as shown, are held within the sockets 5 by coöperating pins and washers 8, but other means may, of course, be provided for this purpose. The inner bars of the frame brackets 4 are vertically extended and the outer bars thereof are inclined, so that the said frame brackets are approximately triangular in form. At their extreme lower ends, the said brackets are provided with bearings 9, in which the trunnions 10 of the carrier bucket are journaled. This carrier bucket is preferably made up of a pair of cast heads or end plates 11 and a sheet metal body portion 12, the former of which are provided with flanges to which the ends of the said sheet metal body portion 12 are riveted. The heads or end plates 11, as well as the frame brackets 4, are preferably made in duplicates. Each head 11, at the central portion of its upper edge, is provided with an outwardly projecting cam flange 13 formed with the central lock notch 14, which latter is adapted normally to be engaged by the inwardly projecting end of a lock lever 15 pivotally connected to one or the other of the frame brackets 4 and working in a recess thereof, as shown at the right in Fig. 1. This lock lever 15 may be applied to either frame bracket 4. Also, each frame bracket 4 is provided with a bearing lug 16, to one or the other of which a tripping bell crank 17 is pivotally connected. The lower arm of the bell crank 17 is connected by a rod 18 to the outer end of the lock lever 15. The upper arm of the said bell crank 17 is bent latterally, as best shown in Fig. 2, so that it is adapted to strike against the trip lug 2 of the track wire.

With the arrangement illustrated in the drawings, when the truck, traveling from the left toward the right, reaches a point where the upper arm of the bell crank 17 strikes against the trip lug 2, the lock lever 15 will be caused to release the bucket and the latter will then be free to turn upside down into a dumping position, as indicated by dotted lines in Fig. 2. When the bucket is turned by hand from its dumping position back to its normal position, the under edge of the cam flange 13 will press downward the inner end of the lock lever 15 until the bucket reaches its normal position, whereupon the said lock lever will engage the notch 14 and again lock the bucket. In the arrangement shown, gravity will tend to normally hold the lock lever 15 in an operative position, but a spring may be applied to insure this result, if desired. As already indicated, the levers 15 and 17 may be applied to either one of the frame brackets 4, according to the direction in which the carrier is to be run from a filling to a discharging position.

As an extremely simple and highly efficient device for securing the carrier in any desired stationary position on the track wire, a cam lever 19 is eccentrically pivoted to the projecting end of the trunnions of one of the wheel brackets 6. When this lever 19 is in the position shown by full lines in Fig. 2, the coöperating wheel 7 is free to rotate; but when the said lever is turned into the position indicated by dotted lines in Fig. 2, the hub of the wheel will be clamped against the wheel bracket and held against rotation so that the carrier will not move on the track wire.

The entire carrier is of very simple, strong, durable and generally efficient construction and, furthermore, is of comparatively small cost.

What I claim is:

1. The combination with a carrier truck frame made up of a top bar and a pair of approximately triangular depending brackets which lie in the same vertical plane with their inner edges extending parallel and vertically to each other and having their upper horizontal portions rigidly secured to the ends of said top bar, of truck wheels connected to the upper outer portions of said brackets, and a bucket working between said brackets and pivotally connected to the lower contracted end portions thereof.

2. The combination with a carrier truck frame made up of a top bar and approximately triangular depending trussed frame brackets extending in the same vertical plane and rigidly secured to the ends of said top bar, truck wheels connected to the upper outer portions of said frame brackets, and a bucket working between said frame brackets and pivotally connected to the lower end portions thereof.

In testimony whereof I affix my signature in presence of two witnesses.

THEODORE LOE.

Witnesses:
ANTON LOE,
MARTIN LOE.

---

Copies of this patent may be obtained for five cents each, by addressing the "Commissioner of Patents, Washington, D. C."